(12) United States Patent
Bostwick

(10) Patent No.: US 8,444,323 B2
(45) Date of Patent: May 21, 2013

(54) BEARING LOCK FOR A MOTOR ASSEMBLY

(75) Inventor: Peter Bostwick, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 13/024,409

(22) Filed: Feb. 10, 2011

(65) Prior Publication Data

US 2012/0207420 A1     Aug. 16, 2012

(51) Int. Cl.
*F16C 43/04* (2006.01)

(52) U.S. Cl.
USPC ........................................... 384/585

(58) Field of Classification Search
USPC ................. 384/537, 538, 539, 559, 560, 561, 384/584, 585; 310/90
IPC .................................................. H02K 7/08
See application file for complete search history.

(56) References Cited

U.S. PATENT DOCUMENTS

| | | | | |
|---|---|---|---|---|
| 3,726,575 A * | 4/1973 | Moorman | ...................... | 384/420 |
| 4,688,952 A * | 8/1987 | Setele | ........................... | 384/537 |
| 4,910,424 A * | 3/1990 | Borcherding | ................... | 310/90 |
| 6,007,253 A * | 12/1999 | Rutter | ............................ | 384/539 |
| 6,145,199 A * | 11/2000 | Malchow et al. | .......... | 29/898.07 |
| 6,318,900 B1 * | 11/2001 | Bere et al. | ...................... | 384/535 |
| 2003/0099419 A1 * | 5/2003 | Vignotto et al. | .............. | 384/539 |

* cited by examiner

*Primary Examiner* — Phillip A. Johnson
(74) *Attorney, Agent, or Firm* — Quinn Law Group, PLLC

(57) ABSTRACT

A bearing lock is provided that improves upon existing methods of stabilizing a bearing in an electric motor. The bearing is fit between a rotatable shaft and a nonrotating annular support. The bearing has an inner race surrounding the rotatable shaft and has an outer race surrounded by the annular support. The bearing lock has an annular body with a midportion, an inner wall, and an outer wall. Both the inner wall and the outer wall extend generally in a first direction from the midportion and are spaced from one another to define an annular cavity therebetween. The outer wall has circumferentially-spaced integral tabs that extend at least partially toward the inner wall to provide a biasing force to lock the body to the annular support when the annular support is placed in the annular cavity.

19 Claims, 4 Drawing Sheets

BEARING LOCK FOR A MOTOR ASSEMBLY

TECHNICAL FIELD

The invention relates to a lock for a bearing on a motor assembly, and specifically for a bearing on a pump motor of a hybrid transmission.

BACKGROUND

Electric motors typically have a rotor with a rotor shaft that rotates when the motor is powered. The motor shaft is supported by a cover or endshield of the motor, with a bearing between the rotating shaft and the nonrotating endshield. If the electric rotor is subjected to significant intermittent forces, such as may occur when the motor is used on a vehicle traveling over uneven road surfaces, the bearing must be sufficiently stabilized to withstand the forces. Electric motors with larger-sized rotors also have relatively large forces placed on the bearing. Bearings are sometimes bolted or otherwise secured to the endshield. This requires additional packaging space for the bolt and for access to the bolt. Beveled snap rings may be used to secure the bearing to the endshield. These also require significant axial packaging space.

SUMMARY

A bearing lock is provided that improves upon existing methods of stabilizing a bearing in an electric motor. The bearing lock requires minimal packaging space and assembly steps. The bearing is fit between a rotatable shaft and a non-rotating annular support. The bearing has an inner race surrounding the rotatable shaft and has an outer race surrounded by the annular support. The bearing lock has an annular body with a midportion, an inner wall, and an outer wall. Both the inner wall and the outer wall of the annular bearing extend generally in a first direction from the midportion and are spaced from one another to define an annular cavity therebetween. The outer wall has circumferentially-spaced integral tabs that extend at least partially toward the inner wall to provide a biasing force to lock the annular body of the bearing lock to the annular support of the endshield when the annular support is placed in the annular cavity.

The bearing lock may be for a motor assembly that has a rotatable motor shaft defining an axis of rotation, and an endshield partially enclosing the motor assembly adjacent an end of the motor shaft. The endshield has an annular extension extending generally parallel with the axis of rotation. An outer surface of the annular extension defines a groove at least partially circumscribing the annular extension. A bearing surrounds the motor shaft near the end of the motor shaft. The bearing has an inner race fit to the motor shaft and an outer race fit to an inner surface of the annular extension of the endshield so that the motor shaft is supported by the endshield at the bearing. The tabs of the bearing lock contact the annular extension of the endshield within the groove to substantially prevent axial movement of the annular body of the bearing lock on the annular extension and provide a biasing force to lock the annular body of the bearing lock to the annular support of the endshield with the inner wall providing an axial force on the bearing outer race. No fasteners or adhesives are used to secure the bearing lock to the annular extension. The tabs of the bearing lock in the groove of the annular extension, along with the complementary shape of the inner and outer walls of the bearing lock and the annular extension of the endshield secure the bearing lock to the annular extension and ensure that the bearing remains in the installed axial position.

The above features and advantages and other features and advantages of the present invention are readily apparent from the following detailed description of the best modes for carrying out the invention when taken in connection with the accompanying drawings.

DETAILED DESCRIPTION

Figure 1:
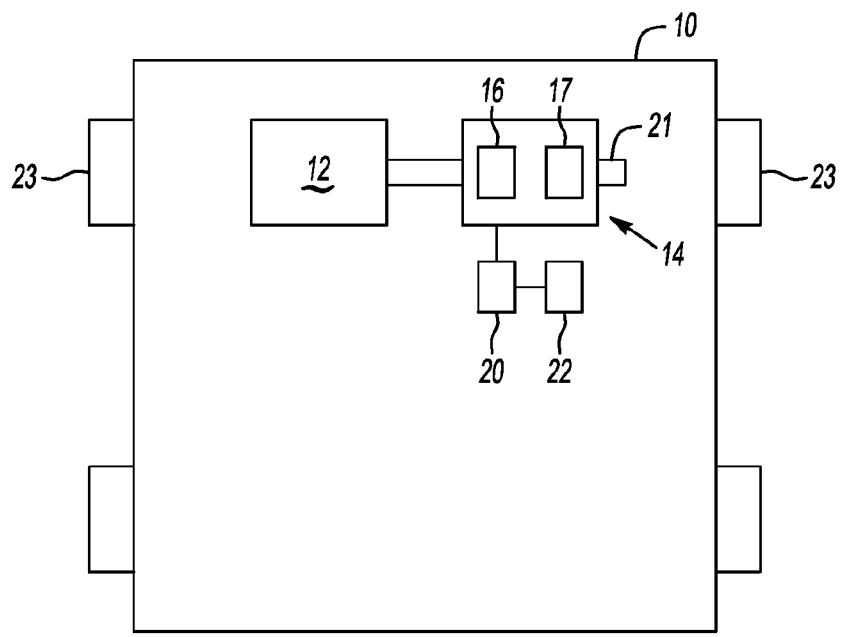
FIG. 1 is a schematic illustration of a vehicle with a hybrid transmission including an electric motor assembly for powering a pump.

Referring to the drawings, wherein like reference numbers refer to like components throughout the several views, FIG. 1 shows a vehicle 10 with an engine 12 and a hybrid transmission 14. The hybrid transmission 14 includes a motor/generator 16 and a gearing arrangement 17 with various hydraulically-engageable clutches. A pump is electrically powered by an electric motor assembly 22 to provide hydraulic fluid to the transmission gearing arrangement 17 and clutches. The transmission 14 is shown only schematically. The final drive train that connects the transmission output member 21 to vehicle wheels 23 is not shown, but is well understood by those skilled in the art.

Figure 2:
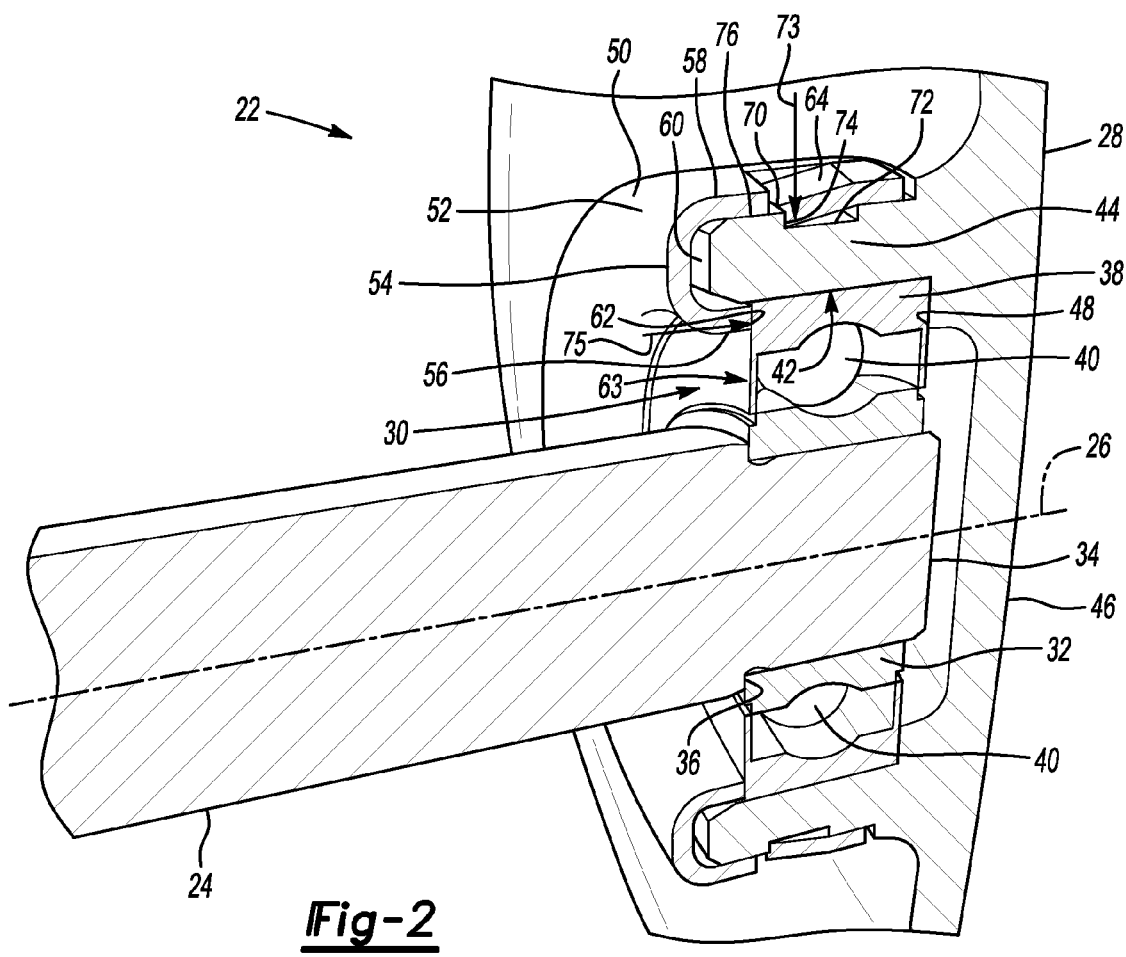
FIG. 2 is a schematic perspective cross-sectional fragmentary view of a portion of the electric motor assembly, taken at lines 2-2 in FIG. 3, including a first embodiment of a bearing lock secured to an endshield to secure a bearing.

A portion of the electric motor assembly 22 is shown in FIG. 2. The motor assembly 22 has a rotatable motor shaft 24 that defines an axis of rotation 26. The motor shaft 24 turns via a rotor (not shown) when electric power is provided to a stator (not shown) of the motor assembly 22, as is understood by those skilled in the art. The rotor and stator are installed to the left along shaft 24 in FIG. 2. An endshield 28 partially encloses the motor assembly 22. Typically, another endshield is spaced along the motor shaft 24, except that the motor shaft 24 extends through the other endshield in order to provide power to the pump 20 of FIG. 1. A bearing 30 surrounds the motor shaft 24 to support the motor shaft 24 at the endshield 28. Another bearing supports the motor shaft 24 where it extends through the other endshield (not shown). Although shown and described below with respect to bearing 30, the bearing lock 50 may be used to lock this latter type of bearing as well.

The bearing 30 has an inner race 32 that is press fit over a narrowed portion of the motor shaft 24 near an end 34 of the motor shaft 24. The inner race 32 abuts a shoulder 36 formed by the motor shaft 24. The shoulder 36 acts as a stop to properly position the inner race 32 axially with respect to the motor shaft 24 when press fitting the inner race 32 on the motor shaft 24.

The bearing 30 has an outer race 38 with rolling elements 40 housed between the outer race 38 and the inner race 32 to allow rotation of the inner race 32 with the motor shaft 24 relative to the nonrotating outer race 38 and nonrotating endshield 28. The outer race 38 is slip fit at an inner surface 42 of an annular extension 44 of the endshield 28. The annular extension 44 is also referred to as a nonrotating annular support, and extends generally parallel with the axis of rotation 26 toward the center of the motor assembly 22 away from the axially-outermost side 46 of the endshield 28. The annular extension 44 defines a shoulder 48 which the outer race 38 abuts when fit to the annular extension 44. The shoulder 48 prevents axial movement of the outer race 38 toward the outermost side 46 of the endshield 28.

The shoulders 36 and 48 are at opposite sides of the inner race 32 and outer race 38, respectively. Although the shoulders 36, 48 significantly prevent axial movement of the bearing 30, when used with a wave spring or bearing preload washer, some relative movement could occur between bearing 30 and the endshield 28 of the motor assembly 22 due to vibrations such as may occur with a relatively large rotating rotor mass connected to the motor shaft 24 when vibration forces are larger than the bearing preload force. In order to prevent any such movement and minimize associated wear on the bearing 30 or damage to the endshield 28 due to fatigue or impact loading, a bearing lock 50 is provided. The bearing lock 50 is easily installed over the annular extension 44 of the endshield, and provides a continuous axial force on the outer race 38 of the bearing 30 to stabilize the bearing 30.

Specifically, the bearing lock 50 has an annular body 52 with a midportion 54. An inner wall 56 and an outer wall 58 of the bearing lock 50 extend generally parallel to one another and parallel to the axis of rotation 26 from the midportion 54 toward the outermost side 46 of the endshield 28. This orientation allows the inner and outer walls 56, 58 of the bearing lock 50 to define an annular cavity 60 between the walls 56, 58. The walls 56, 58 are sized so that the annular cavity 60 can receive the annular extension 44 of the endshield 28 when the annular body 52 of the bearing lock 50 is fit over the annular extension 44 with an end 62 of the inner wall 56 of the bearing lock 50 continuously contacting the bearing outer race 38.

Figure 3:
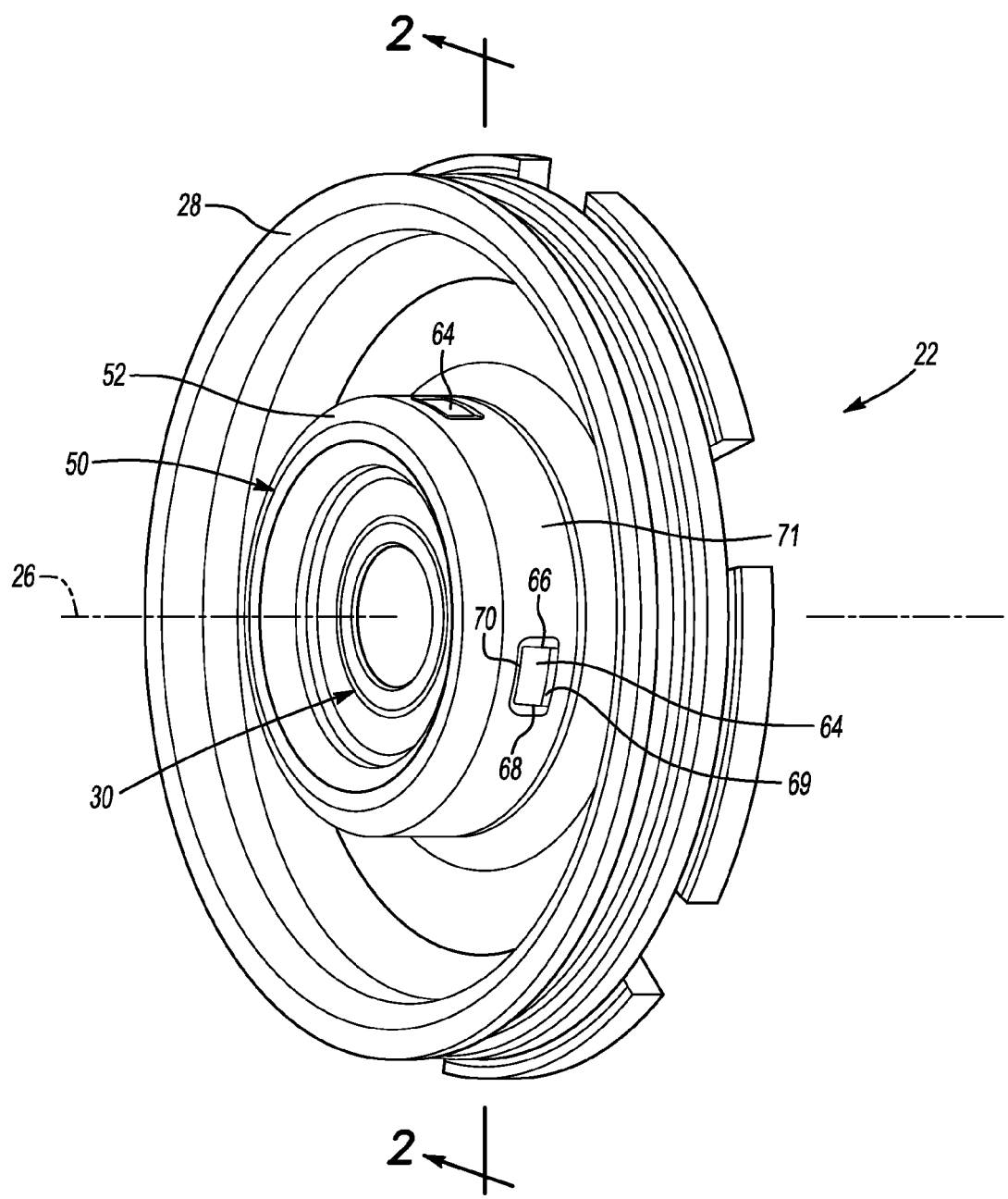
FIG. 3 is a schematic perspective illustration of the bearing lock of FIG. 2 secured to the end shield with the motor shaft removed.
Figure 4:
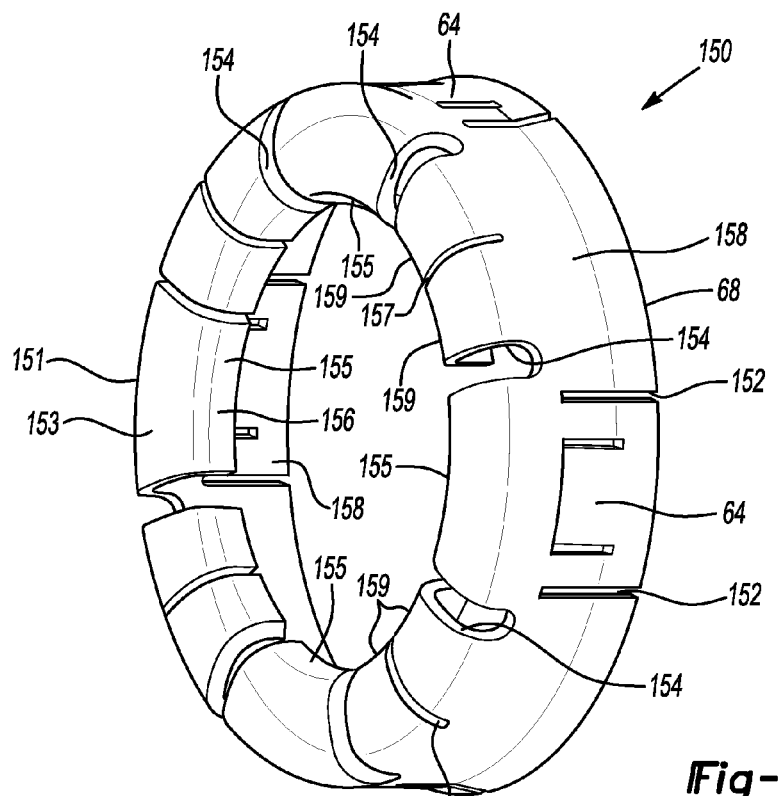
FIG. 4 is a schematic perspective illustration of a second embodiment of a bearing lock for use with the motor assembly of FIG. 2.
Figure 5:
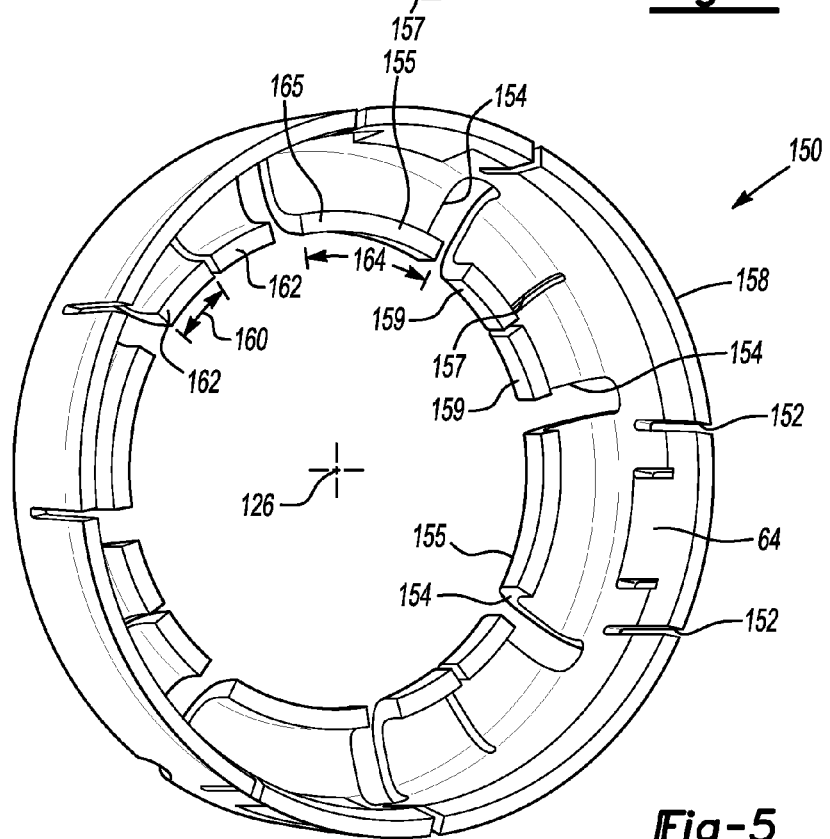
FIG. 5 is another schematic perspective illustration of the bearing lock of FIG. 4.

Tabs 64 are integrally formed in the outer wall 58 of the bearing lock 50 so that each tab 64 is separated from the outer wall 58 at two sides 66, 68, and at an end 70, and angles inward toward inner wall 56 from a base 69 formed integrally with the outer wall 58 to an end 70 as best shown in FIG. 3. The tabs 64 may be referred to as locking tabs. The tabs 64 may be punched in the outer wall 58 to form the sides 66, 68 and end 70. The annular body 52 is relatively stiff steel. Accordingly, the ends 70 of the tabs 64 extend at least partially inward toward the inner wall 56 of the bearing lock 50, as shown in FIG. 2.

Two tabs 64 are visible in FIG. 3. Two other tabs 64 not visible in FIG. 3 are equally-spaced from the tabs 64 that are shown, so that there are four tabs 64 total about the circumference 71 of the outer wall 58 of the bearing lock 50. In other embodiments, different numbers of tabs 64 may be used. The tabs 64 need not be equally spaced to provide the locking function described herein.

As shown in FIG. 2, the outer surface of the annular extension 44 of the endshield 28 has a groove 72 formed in it. The groove 72 may be a continuous circumferential groove, or a series of grooves may be provided, with each respective groove in the series corresponding with a respective one of the tabs 64. For purposes of assembly, a circumferential groove 72 allows the annular body 52 of the bearing lock 50 to be in any circumferential orientation, thereby simplifying assembly (i.e., there is no need to align the tabs 64 of the bearing lock 50 with groove 72 in the annular extension 44 of the endshield 28, as there would be if the endshield 28 had discrete grooves.

When the annular body 52 of the bearing lock 50 is placed around the annular extension 44 of the endshield 28 so that the annular extension 44 is received in the annular cavity 60 defined by the bearing lock 50, the tabs 64 are initially flexed outward by the distal end 76 of the annular extension 44, as the annular extension 44 is wider at the distal end 76 than it is at the groove 72. As the annular extension 44 is moved further axially toward the annular body 52 of the bearing lock 50, or the annular body 52 is moved further axially toward the annular extension 44, the tabs 64 snap into the groove 72 due to a biasing force created by the tabs 64. When the tabs 64 snap into the groove 72, there is a force applied to the ends 70 of the tabs 64 due to interference with the annular extension 44. The axial force is transmitted through the bearing lock 50 to the end 62 of the inner wall 56 of the bearing lock 50 at the outer race 38 of the bearing 30, and is shown in FIG. 2 as axial force 75. The axial force 75 acts to hold the bearing 30 tight against the endshield 28, and may be referred to as a bearing locking force. Even when in the groove 72, the tabs 64 are still flexed slightly outward from their original, inwardly-bent position so that they provide a continuous biasing force 73 on the annular extension 44 of the endshield 28. The respective end 70 of each of the tabs 64 interferes with the annular extension 44 at the end 74 of the groove 72, with the force 75 preventing the annular body 52 of the bearing lock 50 from shifting axially away from the annular extension 44 of the endshield 28. The annular body 52 is thus locked to the annular extension 44 by the tabs 64.

The motor assembly 22 can be assembled in a variety of different ways. For example, the bearing 30 could first be fit into the annular extension 44 of the endshield 28, the bearing lock 50 with annular body 52 fit over the annular extension 44, and then the motor shaft 24 fit into the inner race 32 of the bearing 30. Alternately, the bearing 30 and motor shaft 24 could be fit within the annular extension 44, and the bearing lock 50 with annular body 52 installed last. In all methods of assembly, one or both of the annular body 52 and annular extension 44 are slid axially relative to one another until the tabs 64 of the bearing lock 50 snap into the groove 72 of the annular extension 44, locking the annular body 52 of the bearing lock 50 to the annular extension 44 of the endshield 28, and thereby securing the axial position of the bearing 30. No fasteners are used to secure the bearing lock 50. Minimal packaging space is required, as the annular body 52 closely follows the contours of the annular extension 44, with no additional flanges or extensions required.

Figure 6:
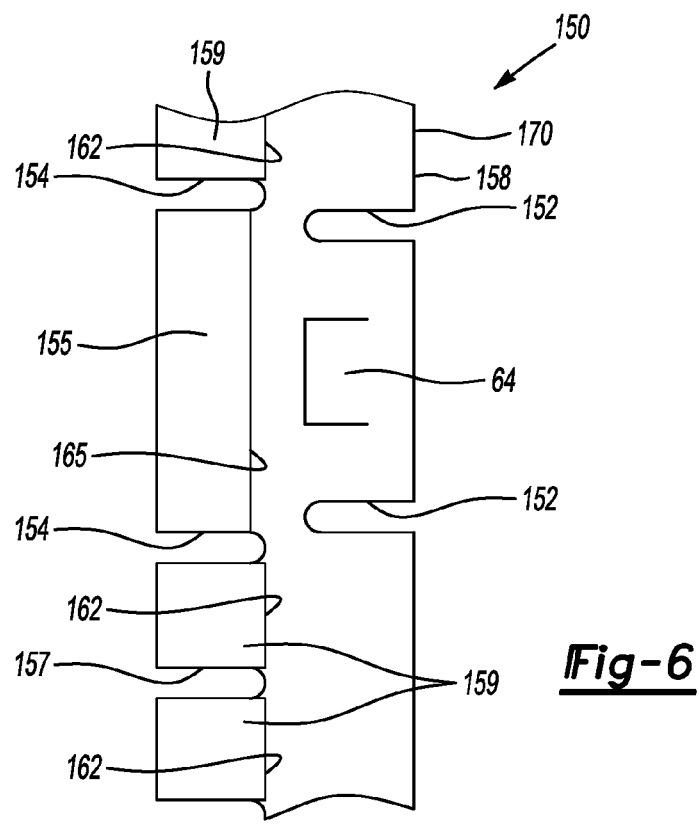
FIG. 6 is a schematic fragmentary side view illustration of the bearing lock of FIGS. 4 and 5.
Figure 7:
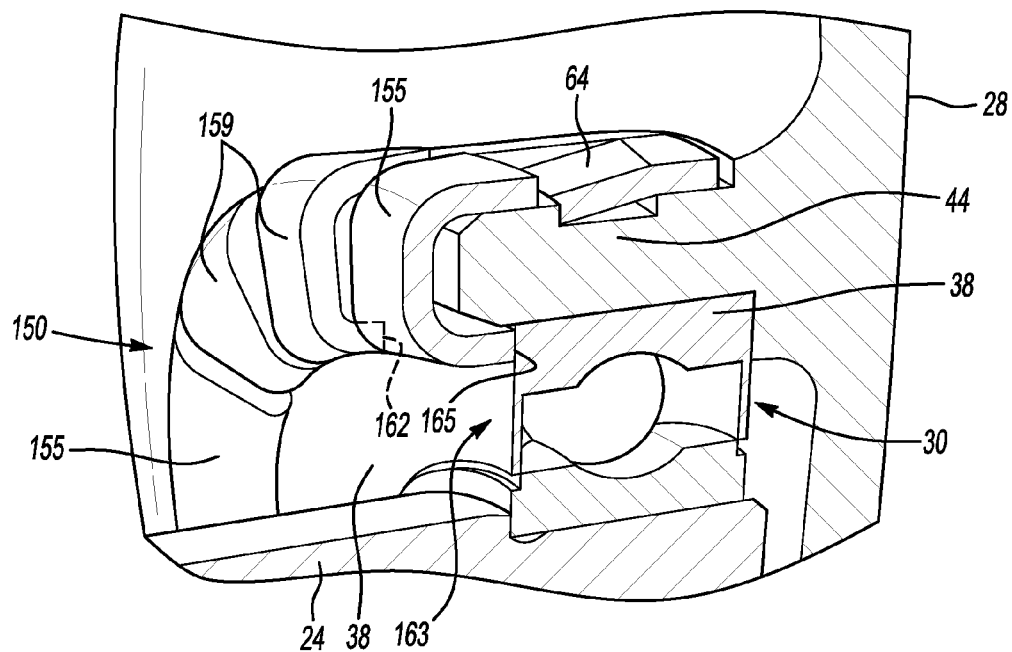
FIG. 7 is a schematic perspective cross-sectional fragmentary view of a portion of the electric motor assembly of FIG. 2 with the bearing lock of FIGS. 4-6 installed on the motor shaft.

FIGS. 4, 5, 6 and 7 show another embodiment of a bearing lock 150 configured to be installed on the annular extension 44 of FIG. 2 in place of the bearing lock 50 to retain the bearing 30 in an installed axial location on the motor shaft 24, as shown in FIG. 7. The bearing lock 150 is designed to apply a lower magnitude axial force to the outer race 38 of the bearing 30 of FIG. 2 than the bearing lock 50. The bearing lock 150 has an annular body 151 with a midportion 153, an inner wall 156 and an outer wall 158. The inner wall 156 and the outer wall 158 extend generally parallel with one another from the midportion 153. The bearing lock 150 has an outer wall 158 with notches 152 in the outer wall 158 on either side of each tab 64. Additionally, the inner wall 156 of the bearing lock 150 has notches 154 on either side of the each tab 64. The notches 154 are spaced further from the tab 64 than the notches 152. The notches 154 define fingers 155 radially-aligned with respective tabs 64. Still another notch 157 is formed in the inner wall 156 of the bearing lock 150 between each pair of notches 154 that are between adjacent tabs 64. The notches 154 and 157 define a pair of smaller fingers 159 between each pair of fingers 155. Thus, the inner wall 156 of the bearing lock 150 is formed of fingers 155, 159. The fingers 155 are referred to as a first set of fingers. The fingers 159 are referred to as a second set of fingers. The ends 162 of the fingers 159 occupy much less circumferential distance 160 about the center axis 126 of the bearing lock 150 than the circumferential distance 164 occupied by the fingers 155.

Additionally, referring to FIG. 6, the bearing lock 150 is designed so that the fingers 159 have more deflection when the bearing lock is installed, and will bear more of the load applied to the outer race 38 of the bearing 30 of FIG. 7 than will the fingers 155. In an unstressed state, as shown in FIG. 6, the ends 162 of the fingers 159 are in a different plane than the ends 165 of the fingers 155. That is, the ends 162 extend further toward the end 170 of the outer wall 158 of the bearing lock 150 than do the ends 165. Because the fingers 159 are configured to extend further axially toward the end 170, when the ends 162 and 165 of the fingers 155, 159 are in contact with the surface 163 of the outer race 38 when the tabs 64 snap into the groove 72, the fingers 159 must flex more than the fingers 155, and carry more of the load through the bearing lock 150. Because the fingers 155, 159 are more flexible than the inner portion of bearing lock 50 of FIG. 2, the axial biasing force of the bearing lock 150 is significantly less than the axial force 75 of bearing lock 50 of FIG. 2. The loading or stress through the bearing lock 150 goes from the tabs 64 that lock into the annular extension 44 of the endshield 28, then sideways in the bearing lock 150 around the notches 152 and 154 to the fingers 159. The ends 162 of the fingers 159 place most of the load on the outer race 38 of the bearing 30 to hold it in place. The contact with the bearing outer race 38 by the relatively more flexible fingers 155, 159, along with the notches 152 reduce the stiffness of the bearing lock 150 and allow the bearing lock 150 to flex more easily in the axial direction than bearing lock 50.

While the best modes for carrying out the invention have been described in detail, those familiar with the art to which this invention relates will recognize various alternative designs and embodiments for practicing the invention within the scope of the appended claims.

The invention claimed is:

1. A bearing lock for a bearing; wherein the bearing is fit between a rotatable shaft and a nonrotating annular support; wherein the bearing has an inner race surrounding the rotatable shaft and has an outer race surrounded by the annular support, the bearing lock comprising:
   an annular body having a midportion, an inner wall, and an outer wall; wherein both the inner wall and the outer wall extend generally in a first direction from the midportion and are spaced from one another to define an annular cavity therebetween; and
   wherein the outer wall has circumferentially-spaced integral tabs that extend at least partially toward the inner wall to provide a biasing force to lock the annular body to the annular support when the annular support is placed in the annular cavity.

2. The bearing lock of claim 1, wherein the bearing lock is characterized by an absence of any fastener securing the annular body to the bearing or to the annular support.

3. The bearing lock of claim 1, wherein the inner wall of the annular body contacts the outer race when the annular support is placed in the annular cavity to prevent axial movement of the bearing.

4. The bearing lock of claim 3, wherein the inner wall has a first set of notches defining a first set of fingers and a second set of notches defining a second set of fingers, the first and second sets of fingers configured to contact the outer race when the annular support is placed in the annular cavity; and wherein the second set of fingers extend further than the first set of fingers such that the second set of fingers will deflect further than the first set of fingers when the first and second sets of fingers contact the outer race.

5. The bearing lock of claim 4, wherein the outer wall has additional notches.

6. A motor assembly comprising:
   a rotatable motor shaft defining an axis of rotation;
   an endshield partially enclosing the motor assembly and supporting the motor shaft; wherein the endshield has an annular extension extending generally parallel with the axis of rotation; wherein an outer surface of the annular extension defines a groove at least partially circumscribing the annular extension;
   a bearing surrounding the motor shaft; wherein the bearing has an inner race fit to the motor shaft and an outer race fit to an inner surface of the annular extension so that the motor shaft is supported by the endshield at the bearing;
   an annular body having a midportion, an inner wall, and an outer wall; wherein both the inner wall and the outer wall extend generally toward the endshield from the midportion and are spaced from one another so that the annular body defines an annular cavity between the inner wall and the outer wall; wherein the annular cavity is sized to receive the annular extension of the endshield with the inner wall contacting the outer race;
   wherein the outer wall has circumferentially-spaced integral tabs extending toward the midportion, each tab having a respective end angled toward the inner wall; and wherein the tabs contact the annular extension within the groove to substantially prevent axial movement of the annular body on the annular extension and provide a biasing force to lock the annular body to the annular support with the inner wall contacting the outer race to prevent axial movement of the bearing.

7. The motor assembly of claim 6, wherein the motor assembly is characterized by an absence of any fastener securing the annular body to the bearing or to the endshield.

8. The motor assembly of claim 6, wherein the endshield defines a shoulder; and wherein the inner wall of the annular body presses the outer race toward the shoulder.

9. The motor assembly of claim 6, wherein the motor shaft defines a shoulder; and wherein the inner race abuts the shoulder.

10. The motor assembly of claim 6, wherein the tabs are sufficiently biased to snap into the groove when the annular extension is received in the annular groove.

11. The motor assembly of claim 6, wherein the inner wall has a first set of notches defining a first set of fingers and a second set of notches defining a second set of fingers, the first and second sets of fingers configured to contact the outer race when the annular support is placed in the annular cavity; and wherein the second set of fingers extend further than the first set of fingers such that the second set of fingers will deflect further than the first set of fingers when the first and second sets of fingers contact the outer race.

12. The motor assembly of claim 6, wherein the outer wall has additional notches.

13. A hybrid transmission having a pump and comprising:
an electric motor configured to power the pump; wherein the electric motor has:
- a rotatable shaft that powers the pump to provide hydraulic fluid for the transmission;
- an endshield partially enclosing the motor and supporting the motor shaft; wherein the endshield has an annular extension extending generally parallel with the axis of rotation; wherein an outer surface of the annular extension defines a groove at least partially circumscribing annular extension;
- a bearing surrounding the motor shaft; wherein the bearing has an inner race fit to the motor shaft and an outer race fit to an inner surface of the annular extension so that the motor shaft is supported by the endshield at the bearing;
- a bearing lock with:
    - an annular body having a midportion, an inner wall, and an outer wall; wherein both the inner wall and the outer wall extend generally toward the endshield from the midportion and are spaced from one another so that the annular body defines an annular cavity between the inner wall and the outer wall; wherein the annular cavity is sized to receive the annular extension of the endshield with the inner wall contacting the outer race;
    - wherein the outer wall has circumferentially-spaced integral tabs that extend at least partially toward the inner wall; and wherein the tabs contact the annular extension within the groove to substantially prevent axial movement of the annular body on the annular extension and provide a biasing force to lock the annular body to the annular support with the inner wall contacting the outer race to prevent axial movement of the bearing.

14. The hybrid transmission of claim 13, wherein the motor assembly is characterized by an absence of any fastener securing the annular body to the bearing or to the endshield.

15. The hybrid transmission of claim 13, wherein the endshield defines a shoulder; and wherein the inner wall of the annular body presses the outer race toward the shoulder.

16. The hybrid transmission of claim 13, wherein the motor shaft defines a shoulder; and wherein the inner race abuts the shoulder.

17. The hybrid transmission of claim 13, wherein the tabs are sufficiently biased to snap into the groove when the annular extension is received in the annular groove.

18. The hybrid transmission of claim 13, wherein the inner wall has a first set of notches defining a first set of fingers and a second set of notches defining a second set of fingers, the first and second sets of fingers configured to contact the outer race when the annular support is placed in the annular cavity; and wherein the second set of fingers extend further than the first set of fingers such that the second set of fingers will deflect further than the first set of fingers when the first and second sets of fingers contact the outer race.

19. The hybrid transmission of claim 13, wherein the outer wall has additional notches.

* * * * *